June 19, 1934.        J. R. MERCIER        1,963,667
INTERLOCKING BOLT AND NUT
Filed Jan. 15, 1934
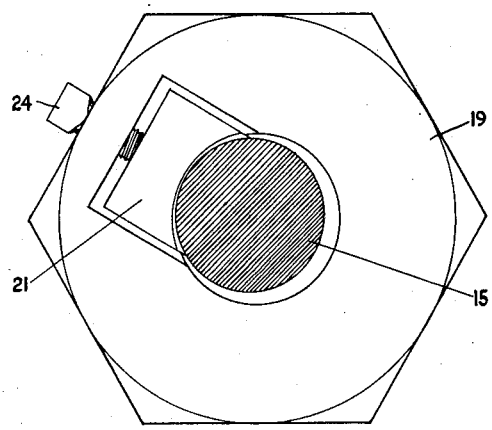
FIG. 1
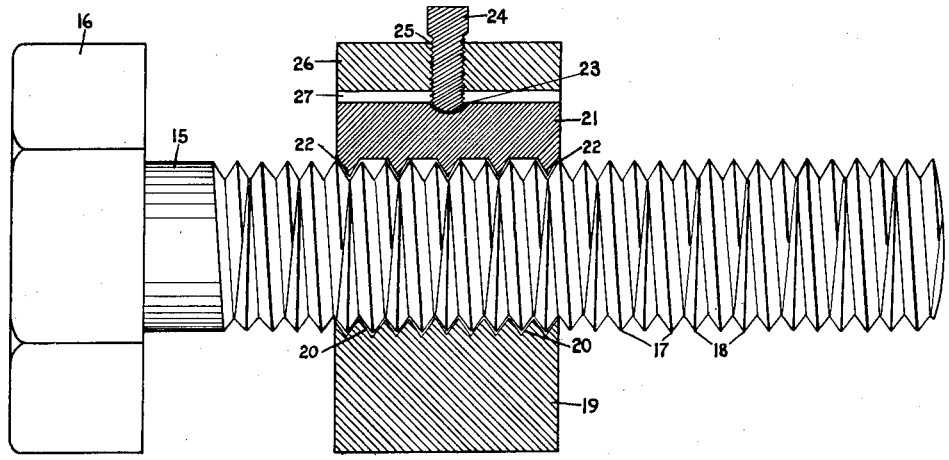
FIG. 2
FIG. 3
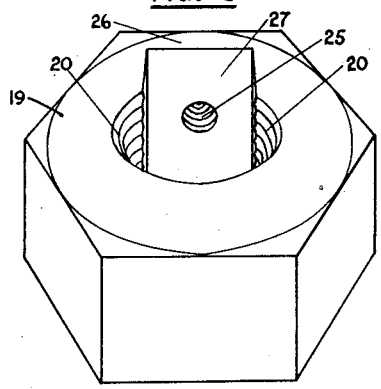
FIG. 4
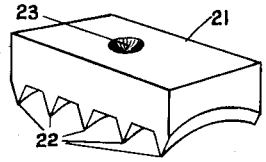
FIG. 5
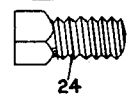
INVENTOR.
J. R. Mercier.
BY: E. J. Fitherstonhaugh.
ATTORNEY.

Patented June 19, 1934

1,963,667

UNITED STATES PATENT OFFICE 1,963,667

INTERLOCKING BOLT AND NUT

Joseph Robert Mercier, Thetford Mines, Quebec, Canada

Application January 15, 1934, Serial No. 706,581

3 Claims. (Cl. 151—14)

The invention relates to an interlocking bolt and nut, as described in the present specification and illustrated in the accompanying drawing that forms part of the same.

The invention consists essentially in the novel means employed for bringing right and left hand threads into locking engagement at the end of the travel of the nut, thereby preventing the reversal of the nut rotation while it remains in engagement with the work, as pointed out in the claims for novelty following a description in detail of the parts required to accomplish the purpose of the invention.

The objects of the invention are to lock the nut effectually through the engagement of a supplementary member with a thread cut in a reverse direction in relation to the thread of the nut, thereby holding the bolt with its nut firmly and non-rotatively in relation to said nut in the place to which it has been introduced for fastening and holding the piece of work; to furnish a nut lock for the higher class of work, or in fact, for any work at a reasonable price to the consumer and at the same time to reduce the cost of construction in car building, and in other structures requiring reliable fastenings; to insure economy in the mass production of these parts without fear of lessening the effectiveness of the lock, and generally to provide a serviceable and durable nut lock.

In the drawing, Figure 1 is a cross sectional view of the bolt showing the nut and supplementary piece forming the locking member mounted thereon.

Figure 2 is a cross sectional view of the nut showing the bolt in a longitudinal view in engagement with the right and left hand threads, of the nut and insert piece respectively.

Figure 3 is a perspective detail of the nut.

Figure 4 is a perspective detail of a locking insert piece.

Figure 5 is a detail of the set screw.

Like numerals of reference indicate corresponding parts in the various figures.

Referring to the drawing, the numeral 15 indicates the bolt having the head 16 and the threads 17 and 18 for the greater portion of its length, these threads being crossed and forming right and left hand threads.

The nut 19 is formed with a right hand thread 20 which turns on the right hand thread 17 of the bolt and carries with it, the locking insert piece 21, which has the arcuate left hand threads 22 engaging with the left hand threads 18 of the bolt.

The piece 21 is recessed at 23 and the bed of this recess is engaged by the set screw 24, this set screw being inserted in the screw hole 25 through the bridge 26, crossing the upper end of the cross slot 27 in the nut made to receive the insert piece 21.

It will now be seen that in the operation of this invention, the nut is screwed on to the bolt until it reaches and engages the work, and then the locking insert piece is mounted within the nut on the left hand thread of the bolt with the result that on engagement with that thread, the rotation to unfasten the nut is in the opposite direction to the said left hand thread. Therefore the insert piece locks the nut firmly in its place and the engagement of this insert piece is fully insured by means of the set screw 24, which jams the left hand threaded piece tightly in the left hand threads of the bolt, therefore there is a perfect nut lock.

What I claim is:—

1. In an interlocking bolt and nut, a nut having a thread cut in one direction, and a slot therethrough opening inwardly through the said thread and interrupting it, an insert piece having a thread cut in the opposite direction from the nut and introduced in said slot and a bolt having double threads cut thereinto and adapted to receive said nut and said locking piece in association therewith.

2. In an interlocking bolt and nut, a bolt having a double thread, a nut having a single thread screwed on said bolt and adapted to be screwed up to the work, and slotted inwardly to interrupt the thread, an insert piece having arcuate threads cut in the opposite direction to the thread of the nut and inserted in said slot, and a set screw holding said insert piece to the thread of said bolt.

3. In an interlocking bolt and nut, a bolt having a double thread, a nut having a right hand thread and slot from the inner wall interrupting said thread and forming a bridge piece roofing the slot and having a threaded hole therethrough, an insert plate having a left hand thread engaging a left hand thread of the bolt coincidently with the engagement of the right hand thread by the nut and means for holding said threaded plate to the bolt.

JOSEPH ROBERT MERCIER.